Dec. 15, 1953      H. Z. MARTIN      2,662,912
HYDROCARBON SYNTHESIS REACTION
Filed July 28, 1950
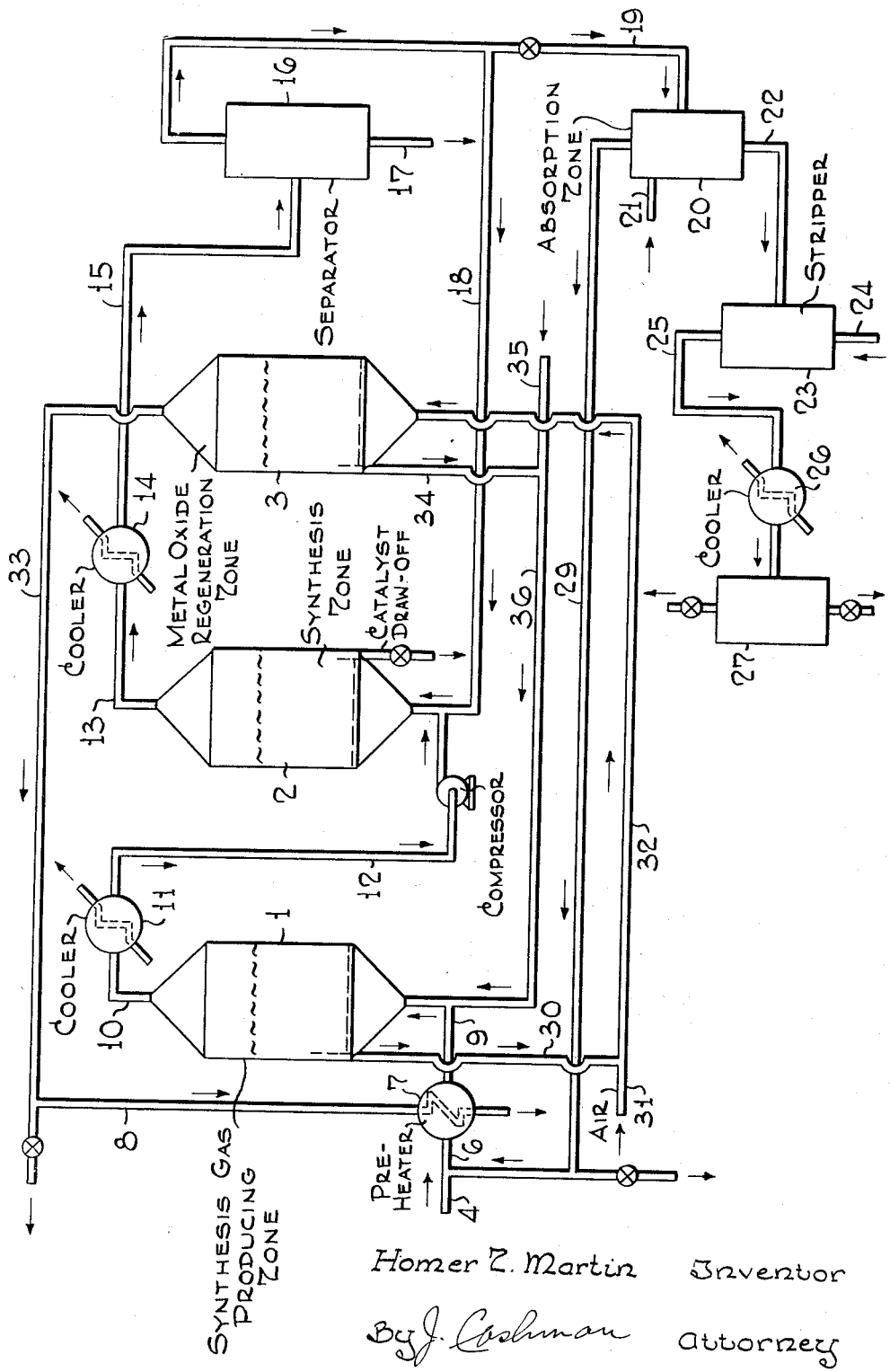
Homer Z. Martin  Inventor
By J. Cushman  Attorney Patented Dec. 15, 1953

2,662,912

UNITED STATES PATENT OFFICE 2,662,912

HYDROCARBON SYNTHESIS REACTION

Homer Z. Martin, Cranford, N. J., assignor to Standard Oil Development Company, a corporation of Delaware Application July 28, 1950, Serial No. 176,371

5 Claims. (Cl. 260—449.6)

The present application is a continuation-in-part of application for "Hydrocarbon Synthesis Reaction," Serial No. 711,757, filed November 22, 1946, now abandoned.

The present invention relates to an improved hydrocarbon synthesis reaction. It is more particularly concerned with a hydrocarbon synthesis process wherein operating conditions are controlled in a manner to effect important economies in the hydrocarbon synthesis process.

In accordance with one embodiment of the present invention, normally gaseous hydrocarbons such as methane, and preferably obtained from the product recovery system of the synthesis process, are partially oxidized by means of an oxygen carrier to form synthesis gas in the preferred proportions of hydrogen and carbon monoxide for use as feed to the synthesis reaction. This procedure wherein the synthesis gas is formed containing about two mols of hydrogen per mol of carbon monoxide obviates the necessity of adjusting the hydrogen and carbon monoxide ratio, as is required wher the synthesis gas is formed by methane "reforming." That is to say, the reforming of methane numbered (1), may be represented as below and it will be noted that the reaction results in the formation of 3 mols of hydrogen per mol of carbon monoxide:

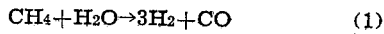
$$CH_4 + H_2O \rightarrow 3H_2 + CO \quad (1)$$

This product is too high in hydrogen and it must be altered as by reacting with carbon dioxide to adjust the hydrogen to carbon monoxide ratio according to the below indicated "Shift" reaction:

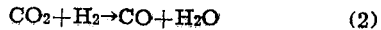
$$CO_2 + H_2 \rightarrow CO + H_2O \quad (2)$$

This latter reaction numbered (2) is usually carried out simultaneously with (1) by including $CO_2$ in the feed to the methane reformer furnace so that various proportions of $H_2$ and $CO$ are attainable depending on the amount of $CO_2$ in the reformer feed.

However, methane reforming is a very unsatisfactory process for producing synthesis gas because of the heat requirements dictated by the highly endothermic nature of the reforming reaction. Heat must be forced into the tubes of the furnace, which tubes contain the reforming catalyst and the reactants. The tubes are usually about 4–6 inches in diameter and are formed from an expensive steel alloy containing nickel and chromium to withstand the high heat and temperature stresses imposed on the tubes, and a temperature is maintained at around 1500°–1700° F. inside the tubes. It requires an outside wall tube temperature about 100° F. above this level and a large heat input, to maintain the reaction at a reasonable rate.

The present invention relates, as indicated, to a combination of inter-related steps in which the synthesis gas is formed from light hydrocarbons, or present in the hydrocarbon synthesis process and recoverable from the product purification system. Such recovered light hydrocarbon product is essentially methane, but also contains some $C_4$ and $C_3$ hydrocarbons. Also, the synthesis gas producing zone is maintained under thermal conditions of heat balance while at the same time the formed synthesis gas contains hydrogen and carbon monoxide properly proportioned as received from synthesis gas generator, and this gas may be delivered, after abstracting a portion of its sensible heat for use elsewhere in the general process, to the reaction zone. Thus, the necessity for altering or modifying the synthesis gas as by a water gas shift reaction, is avoided.

The temperatures employed in the synthesis reaction zone vary, depending on the catalyst used, in the range from about 350°–725° F. Temperatures in the low range, say, from 350°–450° F. are employed where the catalyst is cobalt, suitably promoted as with thoria and usually supported on a carrier. When using a promoted iron catalyst, iron temperatures are employed, i. e., temperatures of from 500°–725° F. or thereabouts. The pressure, likewise, varies and is a function mainly of the catalyst employed. Pressures in the range from about 1 to 5 atmospheres have been employed where the catalyst is a promoted cobalt, but with an iron type catalyst, suitably promoted, the pressure used is of a higher order, say, from 200–600 lbs. per sq. in. gauge.

When employing cobalt type catalyst, it is preferred to use about 1 mol of carbon monoxide to about 2 mols of hydrogen, while when iron catalyst is utilized, about 1 to 2 mols of hydrogen per mol of carbon monoxide in the feed synthesis gases are desirable.

It has heretofore been known in the art to contact gases and solids by passing the gases upwardly through an enlarged treating zone containing a body of finely divided solids to be contacted, at a controlled velocity to maintain the solids in the treating zone in a fluidized state. Under properly controlled conditions, the subdivided solid particles are not only maintained in a highly turbulent and ebullient state, but there exists a rapid and overall circulation of the fluidized solids throughout the fluid bed promoting uniform temperatures therein.

Processes of this character, wherein fluidized solids are contacted with gases, have a number of inherent and important advantages. For example, intimate contact between the gases and the fluid subdivided solids is secured. It is also possible, as indicated, to maintain a substantially uniform temperature throughout the bed as a result of the extremely rapid transfer of heat from one section of the bed to the other due to the rapid circulation of the fluid subdivided solids. Furthermore, due to the rapid transfer of heat between the solids under these conditions, it is possible to readily add or extract heat from the mass at an extremely rapid rate. In these fluidized reactions the small subdivided solids or catalysts usually have a particle size in the range from about 20 to 200 microns and higher. These particles are suspended in a fluid ebullient state by means of the upflowing suspending gases, the superficial velocity [1] of which varies in the general range from about 0.5 to 5 feet per second. The fluid solids technique is employed in the present process.

The invention finds specific application in the production of synthesis feed gases suitable for synthesis in a hydrocarbon synthesis reaction zone, as indicated previously. As discussed heretofore, one method for the production of gases comprising hydrogen and carbon monoxide is to treat hydrocarbons or natural gas, particularly hydrocarbons and natural gas containing methane. The reaction comprises oxidizing the hydrocarbons or natural gas with a reducible metal oxide, preferably iron oxide, FeO.

In the production of synthesis gas using FeO to transfer oxygen to the gas phase, the following reaction represents theoretically perfect operation:

$$FeO + CH_4 \rightarrow CO + 2H_2 + Fe$$

However, depending upon the nature of the metal oxides used, carbon dioxide and water vapor will be formed along with carbon monoxide. It is desirable to have carbon dioxide formed, along with water, during the oxidation since this reaction is much less endothermic than where the methane is oxidized only to carbon monoxide and hydrogen and, therefore, considering the regeneration of the iron to form iron oxide, in a separate vessel, the complete process may be operated so as not to require added heat, all of which will appear more fully hereinafter.

Considering first the iron oxide regeneration. In this step the metal oxide reduced by the methane or natural gas is removed from the bottom of the synthesis gas generator and burned with air in a separate vessel generally operated at low pressure in order to avoid having to compress the air required more than necessary. The oxidation of the metal by air is carried out at a temperature of about 100°–200° F. higher, generally, than that existing in the synthesis gas generating zone, which latter reaction occurs at temperatures of from about 1400°–2000° F. The oxidation of the metal oxide causes the liberation of a large amount of heat of oxidation. This heat is absorbed by circulating to the burning vessel a large excess quantity of the metal; thus, only a small portion of the circulating metal is burned and the major portion of the circulation is for the absorption of this heat of combustion.

In further explanation of this phase of the process, the reactions involved in the use of iron oxide to oxidize the hydrocarbon gas and the regeneration of the thus reduced metal oxide, together with the quantities of heat absorbed or evolved in B. t. u. per pound mol are set forth below, on the basis of ½ mol of oxygen ($\frac{1}{2}O_2$).

$$FeO + CH_4 \rightarrow CO + 2H_2 + Fe \quad (100{,}000 \text{ absorbed}) \quad (1)$$

$$FeO + \tfrac{1}{4}CH_4 \rightarrow \tfrac{1}{4}CO_2 + \tfrac{1}{2}H_2O + Fe \quad (29{,}500 \text{ absorbed}) \quad (2)$$

$$Fe + \tfrac{1}{2}O_2 \rightarrow FeO \quad ((116{,}000 \text{ evolved}) \quad (3)$$

Combining Equations 2 and 3, there is obtained the following equation:

$$\tfrac{1}{4}CH_4 + \tfrac{1}{2}O_2 \rightarrow \tfrac{1}{4}CO_2 + \tfrac{1}{2}H_2O \quad (86{,}500 \text{ B. t. u. evolved})$$

Combining Equations 1 and 3, there is obtained the following equation:

$$CH_4 + \tfrac{1}{2}O_2 \rightarrow CO + 2H_2 \quad (16{,}000 \text{ B. t. u. evolved})$$

Therefore, although the partial oxidation of methane with iron oxide to form hydrogen and carbon monoxide is per se endothermic, the regeneration of the reduced iron oxide evolves enough heat to more than cancel out the heat absorbed during the synthesis gas generation where $CO_2$ and $H_2O$ are formed, and the two steps considered together may be designated as an integrated exothermic process. The presence of $CO_2$ in the feed to the synthesis zone is no detriment to the synthesis process—in fact, it has certain beneficial effects—and excess water therein may be removed by cooling the gas below 212° F.

The thermal control of the system consisting of a gas generator and the iron reoxidizer is achieved by adjusting the amount of air fed to the iron reoxidizer. In other words, if the temperature in the gas generator tends to become too low, additional air is fed to the iron reoxidizer to oxidize an additional amount of iron to iron oxide, and this additional iron oxide is fed to the gas generator causing larger amounts of $H_2O$ and $CO_2$ to be formed and with them, larger amounts of heat are released in the gas generator. In addition, of course, it is highly desirable to preheat both the air and the hydrocarbon feed streams to the synthesis gas generator by heat exchange with the flue gases from the iron reoxidizer and/or the hot products issuing from the synthesis reactor. The hydrocarbon feed to the generator is preferably held constant. Also, available heat from the synthesis plant may be utilized to preheat the methane or natural gas feed to the synthesis gas producing zone.

It is desirable to deliver an excess of iron together with the iron oxide to the synthesis gas generator. Thus, where it is desired to maintain the temperature in the iron reoxidizing zone, which is at a temperature of, say, 1600° F., about 150° F. above that in the generator, sufficient iron oxide is delivered to the latter to supply the necessary oxygen and in addition, about sixty times as much metallic iron, acting as a heat carrier, is also delivered to the generator. Depending on the desired temperature differential between the two zones, the amount of hot iron passed to generator may be varied, but this amount is always in large excess.

In the accompanying drawing an apparatus

---

[1] "Superficial Velocity" signifies the reactor inlet velocity and assuming the reactor empty other than for the reactant gases and/or vapors.

suitable for carrying out the present invention into effect is illustrated diagrammatically.

The apparatus consists of three vessels:

(a) A synthesis gas producing zone.

(b) A synthesis zone.

(c) A zone for regenerating the metal oxide which becomes reduced in the synthesis gas generator during the formation of the synthesis gas.

The drawing also includes a showing of equipment for recovering desired product and for recycling "tail gas" to the synthesis gas generation zone. These gases contain methane, ethane, etc., and these hydrocarbons formed in the system may be used, at least in part, in lieu of extraneous gaseous hydrocarbon as part of the feed to the synthesis gas producing zone.

Referring in detail to the drawing, 1 represents a synthesis gas producing zone, 2 represents the hydrocarbon synthesis zone and 3 represents the metal oxide regeneration zone. A hydrocarbon gas such as natural gas enters the present system through line 4, is mixed with recycled tail gas from line 29 and this mixture is then discharged via line 6, through a preheater 7, which heater is supplied by heat interchange with hot fumes from the regenerator 3 via line 8. The manner in which these fumes are produced will be disclosed hereinafter. The preheated hydrocarbon gas is withdrawn from preheater 7, via line 9 and charged into the bottom of synthesis gas producing zone 1. The synthesis gas producing zone contains a bed of fluidized metal oxide powder, having a particle size of from 200–400 mesh or thereabouts, and the superficial velocity of the gas in zone 1 is controlled in known manner to form the said fluidized bed. A temperature of from 1400–1800° F. is maintained in zone 1 and a pressure of from 0–100 lbs. per sq. in. is also maintained therein. The metal oxide reacts with the hydrocarbon gas to form $H_2$ and CO, and this product is withdrawn overhead through a line 10, cooled in the cooler 11 and thence discharged into the bottom of the hydrocarbon synthesis zone 2. As previously indicated, cooler 11 may be employed to preheat the air in line 31 to add heat to the iron reoxidizer. In synthesis zone 2, there is disposed a bed of fluidized hydrocarbon synthesis catalyst, such as cobalt or iron, suitably promoted and in the physical form of a powder having a particle size of from 200–400 mesh. Here also, the superficial velocity of the upflowing gas is controlled so as to maintain the catalyst powder in the form of a fluidized bed. A temperature of around 350°–450° F. is maintained in the case where catalyst is promoted cobalt. In the case where the catalyst is promoted iron, the temperature is maintained at a somewhat higher level, say, from 500°–700° F. Pressures from 75–400 lbs. per sq. in. may be maintained in synthesis zone 2 where the catalyst is iron. Under the conditions indicated synthesis occurs and effluent vapors containing the desired products are withdrawn from synthesis zone 2 through line 13. The crude product in line 13 is passed through a cooler 14 to condense normally liquid products and the cooled product passes via line 15 into a separator 16. From separator 16 liquid product is recovered via line 17. This liquid product, consisting of a mixture of water, hydrocarbon oil and oxygenated hydrocarbons is delivered to finishing equipment (not shown) to recover normally liquid hydrocarbons and various chemicals which are dissolved in the water phase and also in the oil phase. Since this purification of the desired product does not go to the heart of the present invention and since good methods are known for carrying out the purification and recovery of the same, it will not be necessary to describe this refining and recovery method in detail.

The overhead product containing $H_2$, CO, $CO_2$ and $C_1$ to $C_4$ hydrocarbons from separator 16 is preferably recycled in part to the synthesis producing zone via line 18. Another portion of this product, however, is delivered via line 19 into a scrubber 20 where it passes upwardly against a down-flowing solvent oil, or the like, introduced through 21. The solvent oil under known conditions of temperature, pressure and oil feed rates serves to remove from the gaseous mixture substantially all of the butane present therein and from 75–85% of the propane present, which hydrocarbons are removed with the solvent petroleum oil via line 22 and delivered to a stripping zone 23 wherein these hydrocarbons, under the influence of heat or stripping steam which may be introduced through line 24, are stripped from the solvent oil and recovered overhead through line 25, passed through a cooler 26 and finally collected in a receiving drum 27. Meanwhile, the undissolved hydrocarbons now rich in methane, with some ethane and propane, as well as some hydrogen and carbon oxides, are recovered from the absorption zone 20, via line 29 and recycled to line 6 to provide a portion of the hydrocarbon feed gas for the synthesis gas producer.

The metal oxide which may be, for instance, iron oxide present in the synthesis gas producing zone, of course, undergoes reduction in a manner heretofore indicated, and reduced metal oxide is withdrawn from the synthesis gas producing zone through line 30, discharged into line 31 containing an air stream wherein the reduced metal oxide becomes suspended in the air stream, and thereafter this suspension is conducted via line 32 into the bottom of metal oxide regenerator 3. In this metal oxide regenerator 3, which is maintained at a temperature of 100°–150° F. above that prevailing in the synthesis gas producer 1, the metal is reoxidized. The regenerated metal oxide is withdrawn from regenerator 3 via line 34, discharged into a line 36 containing a stream of natural gas, methane or a portion of the recycled gas in line 29 and thereafter carried in suspension into synthesis gas producing zone for further use in the process therein taking place.

It will be understood that since the drawing is purely diagrammatic much known, but useful auxiliary apparatus, has been omitted for the purpose of simplicity. Thus, the zones 1, 2 and 3 will normally be provided with "cyclone" separators in the upper portion thereof to separate solids from gases or vapors about to exit from these vessels. Furthermore, the vessels 1, 2 and 3 will be provided with the ordinary foraminous member in the lower portion thereof through which the gases and vapors are forced for the purpose of providing good gas distribution. Furthermore, various pumps, compressors, flow meters, valves and the like will be employed in order to improve the efficiency of the process, but since this equipment and the manner in which it should be operated is well known, it is not deemed necessary to show it in detail in the drawing nor describe it in words in the specification.

Referring again to the process itself, it is pointed out that an aid to the hydrocarbon synthesis proper is attainable by including a halogenated hydrocarbon in the feed to the synthesis zone. Thus, 1% or less of methyl chloride from some extraneous source may be injected into line 12 via line 36. The presence of halogenated hydrocarbons improves the yield and selectivity of the operation.

Numerous modifications of the present invention may be made by those skilled in the art without departing from the spirit thereof.

What is claimed is:

1. Improved hydrocarbon synthesis process which comprises introducing feed gases comprising methane into a synthesis gas production zone, contacting at temperature and pressure conditions adapted to produce hydrogen and carbon monoxide, said feed gases in said synthesis gas production zone with a powdered metal oxide in the form of a fluidized mass whereby the said metal oxide is at least partially reduced to the metallic state, withdrawing reduced metal from said synthesis gas producing zone and treating said metal with air in a regeneration zone at a temperature about 100°–200° F. higher than that existing in said gas generating zone, returning regenerated metal oxide to said gas generating zone, together with hot metal to supply a portion of the heat required therein, removing overhead from said synthesis gas production zone reactant gases comprising hydrogen and carbon monoxide, introducing these gases into a hydrocarbon synthesis zone, contacting said gases in said hydrocarbon synthesis zone with a powdered catalyst in the form of a fluidized mass at temperature and pressure conditions adapted to synthesize hydrocarbons, removing overhead from said hydrocarbon synthesis zone vapors containing normally liquid product and also including normally gaseous hydrocarbons, charging said vapors to a cooling zone where normally liquid constituents are condensed, recovering uncondensed vapors, recycling a portion of said vapors to said hydrocarbon synthesis zone, charging another portion of the uncondensed vapors to a second zone, effecting separation of the $C_3$ and heavier hydrocarbons from the lighter hydrocarbons and recirculating the said lighter hydrocarbons containing predominantly $C_1$ and $C_2$ hydrocarbons to the synthesis gas producing zone.

2. Process as defined by claim 1, wherein the metal oxide employed in said synthesis gas production zone comprises an iron oxide.

3. Process as defined by claim 1, wherein the metal oxide employed in said synthesis gas production zone comprises an iron oxide, wherein said catalyst employed in said hydrocarbon synthesis zone comprises iron, wherein the pressure maintained in said synthesis gas production zone is about 100 lbs. per sq. in., and wherein the temperature employed in said synthesis gas production zone is in the range of about 1400° F. to about 1800° F.

4. Process as defined by claim 1, wherein at least a portion of the vapors removed from the hydrocarbon synthesis zone is treated under conditions to remove therefrom all constituents containing four carbon atoms in the molecule and higher boiling constituents and also to remove therefrom 75–85% of the hydrocarbon constituents containing three carbon atoms in the molecule, and wherein at least a portion of the treated uncondensed gases is recycled to the synthesis gas production zone.

5. Improved hydrocarbon synthesis process which comprises introducing feed gases comprising methane into a synthesis gas production zone, contacting at temperature and pressure conditions adapted to produce hydrogen and carbon monoxide, said feed gases in said synthesis gas production zone with a powdered metal oxide in the form of a fluidized mass whereby the said metal oxide is at least partially reduced to the metallic state, withdrawing reduced metal from said synthesis gas producing zone and treating said metal with air in a regeneration zone at a temperature about 100°–200° F. higher than that existing in said gas generating zone, returning regenerated metal oxide to said gas generating zone, together with hot metal to supply a portion of the heat required therein, removing overhead from said synthesis gas production zone reactant gases comprising hydrogen and carbon monoxide, introducing these gases into a hydrocarbon synthesis zone, contacting said gases in said hydrocarbon synthesis zone with a powdered catalyst in the form of a fluidized mass at temperature and pressure conditions adapted to synthesize hydrocarbons, removing overhead from said hydrocarbon synthesis zone vapors containing normally liquid product and also including normally gaseous hydrocarbons, charging said vapors to a cooling zone where normally liquid constitutents are condensed, recovering uncondensed vapors, recycling a portion of said vapors to said hydrocarbon synthesis zone, charging another portion of the uncondensed vapors to a second zone, effecting separation of the $C_3$ and heavier hydrocarbons from the lighter hydrocarbons and recirculating the said lighter hydrocarbons containing predominantly $C_1$ and $C_2$ hydrocarbons to the synthesis gas producing zone, recovering hot fumes from said regeneration zone and passing said fumes in heat exchange relation with the feed gases to the synthesis gas producing zone to preheat the said feed gases.

HOMER Z. MARTIN.

References Cited in the file of this patent

UNITED STATES PATENTS

| Number | Name | Date |
| --- | --- | --- |
| 1,899,184 | De Simo | Feb. 28, 1933 |
| 2,178,824 | Atwell | Nov. 7, 1939 |
| 2,243,869 | Keith, Jr., et al. | June 3, 1941 |
| 2,274,064 | Howard et al. | Feb. 24, 1942 |
| 2,347,682 | Gunness | May 2, 1944 |
| 2,449,359 | Abrams et al. | Sept. 14, 1948 |
| 2,550,742 | Welty, Jr. | May 1, 1951 |